United States Patent [19]
Moskow

[11] 3,890,999
[45] June 24, 1975

[54] FLUID PRESSURE REGULATOR

[76] Inventor: Eugene D. Moskow, 13243A Figi Way, Marina del Rey, Calif. 90291

[22] Filed: Dec. 15, 1972

[21] Appl. No.: 315,671

[52] U.S. Cl. ......... 137/505.25; 137/484.4; 251/148
[51] Int. Cl. ............................................. F16k 31/36
[58] Field of Search .................. 137/484.4, 505.25; 205/276, 305; 251/148

[56] References Cited
UNITED STATES PATENTS

| | | | |
|---|---|---|---|
| 399,548 | 3/1889 | Nageldinger | 137/505.25 |
| 614,441 | 11/1898 | Burnett | 137/505.25 |
| 672,787 | 4/1901 | Lewis | 137/505.25 |
| 973,609 | 10/1910 | Abrams | 137/505.25 |
| 2,597,482 | 5/1952 | Harrison | 285/305 |
| 2,888,949 | 6/1959 | Evans | 137/505.25 |
| 2,966,916 | 1/1961 | Cummins | 137/505.25 X |
| 3,038,493 | 6/1962 | Griffith | 137/505.25 |
| 3,094,141 | 6/1963 | Maienknecht | 137/505.25 |
| 3,253,608 | 5/1966 | Davis | 137/505.25 X |
| 3,340,894 | 9/1967 | Williams | 137/505.25 |
| 3,363,919 | 1/1968 | Brazell | 285/276 |
| 3,408,095 | 10/1968 | Moore | 285/276 X |
| 3,426,790 | 2/1969 | Dey | 137/505.25 X |
| 3,437,109 | 4/1969 | Carlson | 137/505.25 |
| 3,450,424 | 6/1969 | Calisher | 285/305 |
| 3,464,436 | 9/1969 | Bruning | 251/149.1 |
| 3,623,776 | 11/1971 | Wellman | 137/505.25 |

FOREIGN PATENTS OR APPLICATIONS

| | | | |
|---|---|---|---|
| 5,064 | 2/1912 | United Kingdom | 137/505.25 |

Primary Examiner—Harold W. Weakley
Attorney, Agent, or Firm—Herzig & Walsh

[57] ABSTRACT

A simplified pressure regulator for fluids. The regulator has in-line construction having a tubular in-line valve member that seats against a valve seat in a manner to provide balancing, the in-line construction minimizing pressure drop. The body of the regulator comprises two relatively rotatable parts with in-line inlet and outlet connections thereby facilitating coupling to the regulator.

1 Claim, 6 Drawing Figures

PATENTED JUN 24 1975 3,890,999

FLUID PRESSURE REGULATOR

SUMMARY OF THE INVENTION

The invention is a pressure regulator, for regulating flow and for controlling pressure of fluids, such as water, air, oil, or otherwise.

The pressure regulator is a balanced type having in-line or through flow with inlet and outlet connections for in-line coupling.

The pressure regulator has a valve member or poppet in the form of a tubular member, with a piston responsive to outlet or discharge pressure. One end of the tubular member extends into an inlet chamber in which is provided a seat which is normal to the in-line flow through the regulator. The end of the tubular member moves toward and away from the seat. Passageways are provided in the inlet chamber to conduct the incoming fluid to the area around the extending end of the tubular member and to allow it to pass between the end of the member and the valve seat depending upon their relative positions. The tubular member is sealed. The piston, which is part of the valve member, acts against an adjustable biasing spring.

One end of the tubular member of the valve means extends into an outlet passageway in the valve body with clearance provided between the end of the tubular member and the passageway. The outlet or discharge pressure passes through this annular clearance to reach the actuating piston which adjusts the valve member so that the response time of the regulator is controlled by the amount of this clearance.

The valve body is constructed of two relatively rotatable parts telescoped together to allow free relative rotation or swiveling between them. This provides for ease of making in-line inlet and outlet connections to the regulator.

A primary object of the invention is to make available a pressure regulator of the type referred to which is made up of a minimum of parts and which is adapted for construction from materials such as brass, low carbon steel, aluminum, plastic, or stainless steel.

A further object is to provide a pressure regulator having a balanced and in-line flow construction and having a sealed tubular valve member having an end part extending into a cylindrical passageway to provide clearance to control access of outlet pressure to the primary responsive element of the valve means.

Another object is to provide a valve body formed in two telescoping and relatively rotatable or swiveling parts to accommodate and facilitate in-line inlet and outlet connections to the valve body.

Another object is to provide assembly of the type referred to which utilizes a minimum of parts which readily accommodate themselves to fabrication, production, and assembly.

BRIEF DESCRIPTION OF THE DRAWINGS

Further objects and additional advantages of the invention will become apparent from the following detailed description and annexed drawings, wherein.

DESCRIPTION OF THE PREFERRED EMBODIMENT

Figure 1:
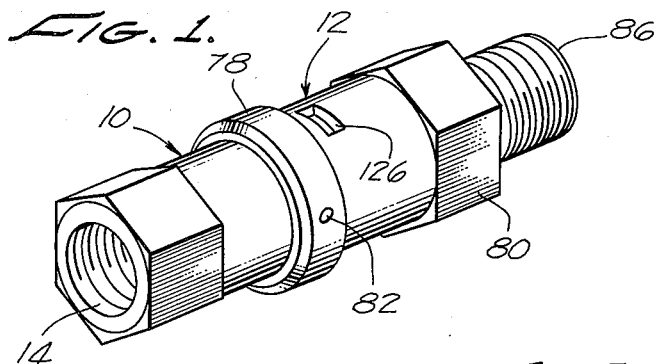
FIG. 1 is a perspective view of a preferred form of the regulator of the invention.
Figure 6:
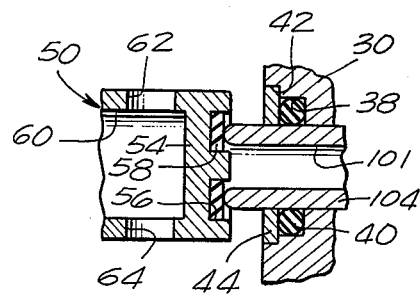
FIG. 6 is a partial detailed view showing the valve in closed position.
Figure 2:
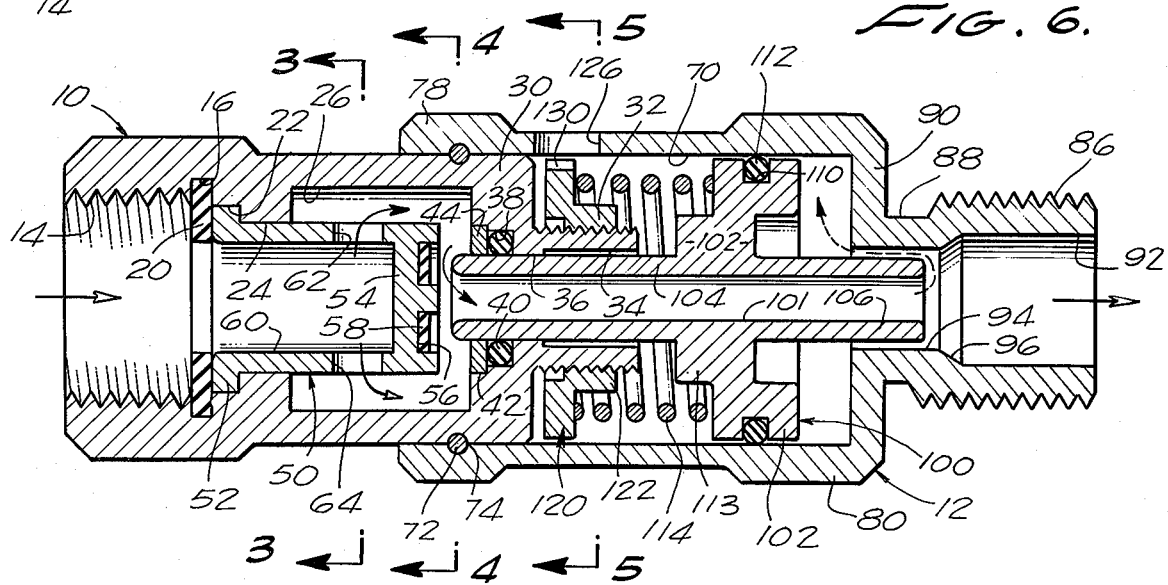
FIG. 2 is a sectional view along the axis of the preferred form of the invention.
Figure 3:
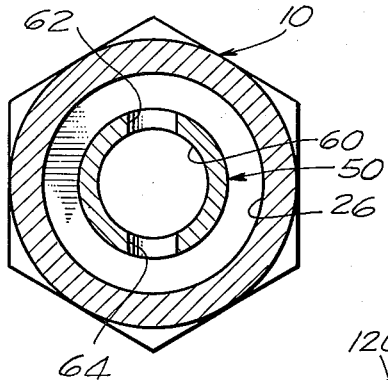
FIG. 3 is a sectional view taken along the line 3—3 of FIG. 2.

Referring to the drawings, the valve is in the form of a cylindrical body having two parts designated at 10 and 12. Part 10 is the inlet part and part 12 is the outlet part. Part 10 has a threaded inlet counterbore 14. It has a counterbore 16 which receives a washer or gasket 20. Numeral 22 designates a further short counterbore adjacent to bore 24. Part 10 has another bore 26 which forms an inlet chamber. Part 10 has an inner end part or wall 30, having an extended threaded nipple 32 which has a bore 34. End wall 30 has a bore 36, and adjacent to it, is a counterbore 38 receiving an O-ring 40 and another counterbore 42 in which is sealing washer 44.

The seat assembly of the valve comprises cylindrical member 50 having an outer diameter to fit bore 24 and having an end flange 52 which is received in the counterbore 22 adjacent to washer 20. Member 50 has an end wall 54 having an annular recess 56 receiving a ring shaped rubber valve seat 58 which will be referred to again presently. The inside bore of cylindrical member 50 is designated at 60 and it has radial ports designated at 62 and 64 to allow incoming fluid to pass through these ports and to pass to the area adjacent valve seat 58.

Figure 4:
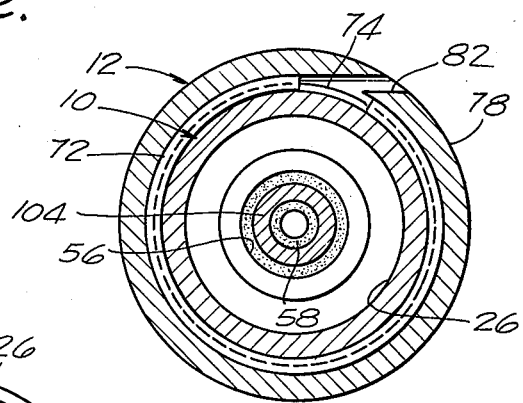
FIG. 4 is a sectional view taken along the line 4—4 of FIG. 2.
Figure 5:
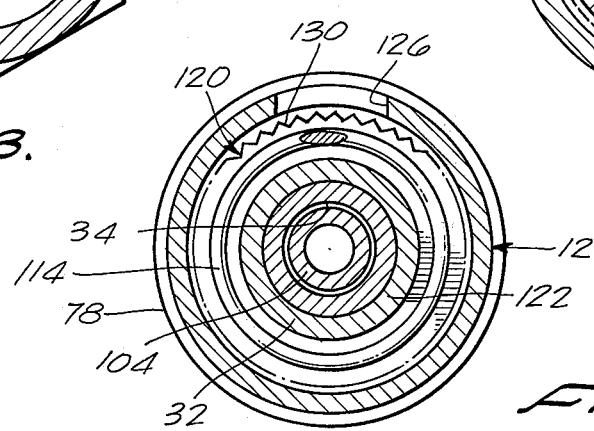
FIG. 5 is a sectional view taken along the line 5—5 of FIG. 2.

Now referring to section or part 12 of the valve body, it has an inside diameter 70 of a size to fit over the outside of part or section 10. The two parts are thus telescoped and are relatively rotatable, that is, capable of swiveling relative to each other. The two parts are held together by lock wire 72 which fits into a circular groove or channel, half of which is formed in the inside diameter 70 of section 12. The other half is formed on the outside of body 10, the channel being designated at 74. Section 12 has end parts of slightly larger diameter as designated at 78 and 80. Lock wire 72 can be fed into the holding channel through tangential hole 82 shown in FIG. 4 so that it comes into position in holding channel 74.

Section 12 has an externally threaded extending end nipple 86 with a neck 88 of smaller diameter between this nipple and end wall 90 of section 12. Nipple 86 has a counterbore 92 and a bore or channel 94 with a bevelled or tapered bore 96 between the two bores.

The valve member or means is generally designated at 100 having bore 101. It embodies a piston part 102 which is integral with a tubular part 104, one end of which extends through bore 36, O-ring 40, and washer 44 to a position adjacent sealing washer 58. It has another end part 106 which extends into bore 94 as shown, providing clearance between the outside of this end part and the internal diameter of bore 94. Piston part 102 has an annular groove 110 which receives a sealing O-ring 112 which seals to the internal diameter 70 of section 12. Piston part 102 has extending shoulder part 113 of smaller diameter which forms a spring retainer for a biasing spring 114. Numeral 120 designates an adjusting ring or collar having an extending internally threaded part 122 which threads over nipple 32 as shown. Section 12 of the body has an access slot 126 as shown to provide access to adjusting collar 120 which has a knurled edge part designated at 130 adapted to be engaged by a screw driver for rotational adjustment. By rotationally adjusting collar or ring 120, it will move axially which will either compress spring 114 or permit it to expand. Compressing the spring increases the pressure setting, and expanding the spring allows the pressure setting to decrease.

From the foregoing, those skilled in the art will readily understand the particular characteristics of the construction of the pressure regulator and the manner in which it operates. However, the operation may be briefly summarized as follows. Inlet and outlet connections can be readily made to threaded inlet bore 14 and to threaded nipple 86 at the outlet end. Making or coupling of connections to the flow regulator is extremely easy because the two parts 10 and 12 are relatively rotatable, that is, one can be swiveled while the other is held. Pressure entering through the inlet coupling passes through ports 62 and 64 to the area between the end of tubular member 104 and the valve seat. Tubular member 104 is sealed adjacent to its end so that the only pressure acting on it its annular end area. This produces the balancing effect. The flow passes through bore 101 of valve means 100 to bore 92 in outlet nipple 86. Pressure is able to pass through the clearance space between tube 106 and bore 92. The amount of this clearance determines the speed of response time of the regulator. This pressure acts on part 102, tending to urge the valve means to the left against biasing spring 114 so that the annular end of tubular member 104 is positioned relative to the valve seat to control the pressure. In this manner, the outlet pressure is regulated. It is to be observed that the flow is in line and that the valve is balanced so that the effect of the inlet pressure on the controlled outlet pressure is minimized. Adjustment of the control pressure is done by adjusting collar 120 as described. Response sensitivity is adjustable by the amount of clearance between the end of tube 106 and bore 94 as described.

From the foregoing, those skilled in the art will readily understand the nature of the invention, its construction, and the manner in which it achieves and realizes all of the objects and advantages as set forth in the foregoing.

The foregoing disclosure is representative of a preferred form of the invention and is to be interpreted as an illustrative rather than a limiting sense, the invention to be accorded the full scope of the claims appended thereto.

What is claimed is:

1. A fluid pressure regulator comprising: a body having in-line flow means through the valve body comprising seat means and a valve member that is relatively movable; the valve member being a tubular member, the tubular member having a piston area whereby it is relatively positionable responsive to fluid outlet pressure to control flow and pressure at the discharge, said tubular member having annular ends exposed to pressure havng equal cross sectional areas, the body comprising a first section and a second section, means forming a joint whereby the sections are joined together in relatively rotatable relationship to allow free relative angular movement without relative axial movement, one section having a threaded inlet and one section having a threaded outlet which are in line whereby the regulator is adapted for relative rotation of the sections to facilitate making inlet and outlet couplings, the first section has a sealed aligned bore and the tubular member has a part extending through said bore in the first section and the tubular member piston portion is sealed to a bore in the second section whereby said joint is not exposed to fluid.

* * * * *